(12) United States Patent
Tylee et al.

(10) Patent No.: US 10,594,821 B1
(45) Date of Patent: Mar. 17, 2020

(54) PROXYING SESSION INITIATION PROTOCOL (SIP) COMMUNICATIONS

(71) Applicant: Metaswitch Networks Ltd., Enfield (GB)

(72) Inventors: Andy Tylee, Enfield (GB); Max Dymond, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 16/388,346

(22) Filed: Apr. 18, 2019

(30) Foreign Application Priority Data

Oct. 12, 2018 (GB) .................................. 1816689.2

(51) Int. Cl.
*H04L 12/70* (2013.01)
*H04L 12/803* (2013.01)
*H04L 29/08* (2006.01)
*H04L 29/06* (2006.01)

(52) U.S. Cl.
CPC ...... *H04L 67/2823* (2013.01); *H04L 67/1029* (2013.01)

(58) Field of Classification Search
CPC ........................ H04L 67/2823; H04L 67/1029
USPC ........ 709/223, 224, 226, 228, 230; 370/221, 370/231, 389, 401
See application file for complete search history.

(56) References Cited

U.S. PATENT DOCUMENTS

| | | | |
|---|---|---|---|
| 7,630,372 B1 | 12/2009 | Androski et al. | |
| 8,059,653 B1 | 11/2011 | Wang et al. | |
| 10,397,316 B2 * | 8/2019 | Bharrat | ............... H04L 67/1027 |
| 2006/0239263 A1 * | 10/2006 | Torronen | .......... H04L 29/06027 |
| | | | 370/389 |
| 2008/0080525 A1 | 4/2008 | Chatilov et al. | |
| 2011/0196976 A1 | 8/2011 | Shimizu et al. | |

(Continued)

FOREIGN PATENT DOCUMENTS

WO 2005050946 A1 6/2005

OTHER PUBLICATIONS

"Understanding Session Border Controllers"—FRAFOS, Oct. 2012 https://www.frafos.com/wp-content/uploads/2012/10/FRAFOS_Underdstanding_SBC.pdf (Year: 2012).*

(Continued)

*Primary Examiner* — Randy A Scott
(74) *Attorney, Agent, or Firm* — EIP US LLP

(57) ABSTRACT

Proxying Session Initiation Protocol (SIP) communications in a load balancing device. An outgoing SIP message is received from a session border controller device. The received outgoing SIP message comprises a routing control parameter in the form of a Uniform Resource Identifier (URI). The received outgoing message comprises one or more additional outgoing routing control parameters different to the URI. The one or more additional outgoing routing control parameters have been originated at the session border controller device to control one or more outgoing routing characteristics at the load balancing device. The one or more additional outgoing routing control parameters are extracted from the received outgoing SIP message. The outgoing SIP message is forwarded to a peer device using the one or more outgoing routing characteristics on the basis of the one or more extracted outgoing routing control parameters.

10 Claims, 7 Drawing Sheets

(56) References Cited

U.S. PATENT DOCUMENTS

| | | | | |
|---|---|---|---|---|
| 2012/0182939 A1* | 7/2012 | Rajan | .................... | A61B 5/0008 370/328 |
| 2013/0212298 A1* | 8/2013 | Bunch | ..................... | H04L 45/42 709/244 |
| 2013/0286836 A1* | 10/2013 | Uzelac | ................... | H04L 47/125 370/235 |
| 2018/0077229 A1 | 3/2018 | Bharrat et al. | | |

OTHER PUBLICATIONS

Combined Search and Examination Report dated Dec. 3, 2018 for GB Application No. GB 1816689.2.

Response to Examination Report dated Feb. 12, 2019 for GB Application No. GB 1816689.2.

No Further Objections dated Mar. 15, 2019 for GB Application No. GB 1816689.2.

United Kingdom Search Report dated Jul. 29, 2019 for UK Application No. GB1816689.2.

\* cited by examiner

PROXYING SESSION INITIATION PROTOCOL (SIP) COMMUNICATIONS

CROSS-REFERENCE TO RELATED APPLICATIONS

This application claims the benefit under 35 U.S.C. § 119(a) and 37 CFR § 1.55 to UK patent application no. 1816689.2, filed on Oct. 12, 2018, the entire content of which is incorporated herein by reference.

BACKGROUND OF THE INVENTION

Field of the Invention

Embodiments of the present disclosure relate to proxying Session Initiation Protocol (SIP) communications, and have particular, but not exclusive, application in load balancers proxying SIP communications with respect to a session border controller.

Description of the Related Technology

SIP is a communications protocol used in the application layer (layer 7) of the Open Systems Interconnection (OSI) communications model. SIP is used in various different types of communications network, for example in mobile telephony networks—i.e. telephony networks having mobile access network portions, fixed line telephony networks—i.e. telephony networks having mobile access network portions and interconnect networks—i.e. communications networks interconnecting two or more carrier networks.

A SIP communications session, often referred to as a call, may be conducted between two SIP endpoints, which may be user agents (UAs) or other peer devices, which may be on the same network or on different networks. Such sessions may include voice, video and messaging applications. Where a call traverses more than one network, each may include a session border controller (SBC) at the edge of the respective network.

If the number of SIP calls arriving into a network per second is too large for a single session border controller to handle, more than one session border controller may be employed and the load distributed between them. The load may be distributed in various ways.

One way is ensuring that endpoints (for example, peer devices installed in different carrier networks) send traffic to a particular session border controller. In this case, all the peer devices in the carrier networks or in the access endpoints have to be configured correctly, and it is not possible to dynamically scale the number of session border controllers when the amount of traffic changes.

Another way is using DNS to balance load across a pool of session border controllers. This solution may not be suitable for some external untrusted networks where reliable DNS may not be possible for technical or administrative reasons or where the SIP DNS behaviour of peer devices is not trusted.

A conventional SIP proxy may conduct routing of SIP messages, to ensure that a request is sent to another entity closer to the targeted user. Proxies are also useful for enforcing policy, such as for determining whether a user is allowed to make a call. A conventional proxy interprets, and, if necessary, rewrites specific parts of a request message before forwarding it. High performance SIP load balancing solutions may be based around a SIP proxy. Minimizing state allows better performance and enables simpler clustered architectures, which improve performance in cloud-native environments. However, for deployment at the edge of a network, known SIP load balancing solutions based around a proxy server have a number of disadvantages.

They need to do full SIP routing of outbound requests, duplicating potentially complex functions in SBCs including active monitoring of peers using OPTIONs polling, DNS lookup, forced override of destination IPs and so on.

There is no topology hiding so the pool of SBCs (or other edge devices) behind them is visible to peers in Via headers and similar. Topology hiding is a key function of SBCs to prevent malicious peers from trying targeted attacks against identified elements inside a service provider's core network.

They do not support what is referred to as dialog "stickiness" (essentially a particular call being associated with a particular member of the SBC pool), which is required where the session border controller devices in the pool behind the load balancer do not have shared dialog state. It is also useful as it results in better performance even where the session border controller devices share dialog state, because there may be a cost to dialogs moving between the session border controller devices.

SUMMARY

According to a first aspect of the present disclosure, there is provided a method for proxying Session Initiation Protocol (SIP) communications in a load balancing device, the method comprising:

receiving an outgoing SIP message from a session border controller device, the received outgoing SIP message comprising a routing control parameter in the form of a Uniform Resource Identifier (URI), wherein the received outgoing message comprises one or more additional outgoing routing control parameters different to the URI, the one or more additional outgoing routing control parameters having been originated at the session border controller device to control one or more outgoing routing characteristics at the load balancing device;

extracting the one or more additional outgoing routing control parameters from the received outgoing SIP message;

forwarding the outgoing SIP message to a peer device using the one or more outgoing routing characteristics on the basis of the one or more extracted outgoing routing control parameters.

According to a second aspect of the present disclosure, there is provided a method for proxying Session Initiation Protocol (SIP) communications in a communication network at a load balancing device, the method comprising:

receiving an outgoing SIP message from a session border controller device, wherein the received outgoing SIP message includes a received outgoing Via header comprising a received branch tag including first branch tag information; and forwarding the outgoing SIP message to a peer device, wherein the forwarded outgoing SIP message comprises the received Via header as a single or topmost Via header when being forwarded, and wherein the single or topmost Via header, when forwarded from the load balancing device, includes the first branch tag information and second branch tag information, the second branch tag information being indicative identifier of the session border controller device.

According to another aspect of the present disclosure, there is provided a method for proxying Session Initiation Protocol (SIP) communications in a communication network at a load balancing device, the method comprising:

receiving an outgoing SIP message from a session border controller device; and forwarding the outgoing SIP message to a peer device, wherein the forwarded outgoing SIP message comprises a SIP dialog identifier tag, wherein the SIP dialog identifier tag includes an identifier of the session border controller device.

According to another aspect of the present disclosure, there is provided a method for proxying Session Initiation Protocol (SIP) communications in a communication network at a load balancing device, the method comprising:

receiving an outgoing SIP message from a session border controller device; and forwarding the outgoing SIP message to a peer device, wherein the forwarded outgoing SIP message comprises a Record-Route header including a Uniform Resource Identifier (URI), wherein a username part of the URI includes an identifier of the session border controller device.

Further features and advantages described herein will become apparent from the following description of preferred examples, which is made with reference to the accompanying drawings.

BRIEF DESCRIPTION OF THE DRAWINGS

In the Figures and accompanying description, parts and steps common between different examples are identified by the same reference numerals, incremented by multiples of 100.

DETAILED DESCRIPTION OF CERTAIN INVENTIVE EMBODIMENTS

Examples described herein relate to load balancers for SIP session border controllers, for example Session Border Controllers (SBCs). The load balancers may operate as stateless SIP proxies in accordance with the "SIP: Session Initiation Protocol" specification, RFC3261. The load balancers may operate at the application layer (layer 7) of the Open Systems Interconnection (OSI) communications model. The load balancers can be used to distribute traffic to session border controllers in various peering scenarios, including mobile Interconnection Border Control Function (IBCF) interconnect (for example in a Voice over LTE (VoLTE) network), enterprise SIP trunks connected to private branch exchanges (PBXs) and wholesale interconnect deployments.

Figure 1:
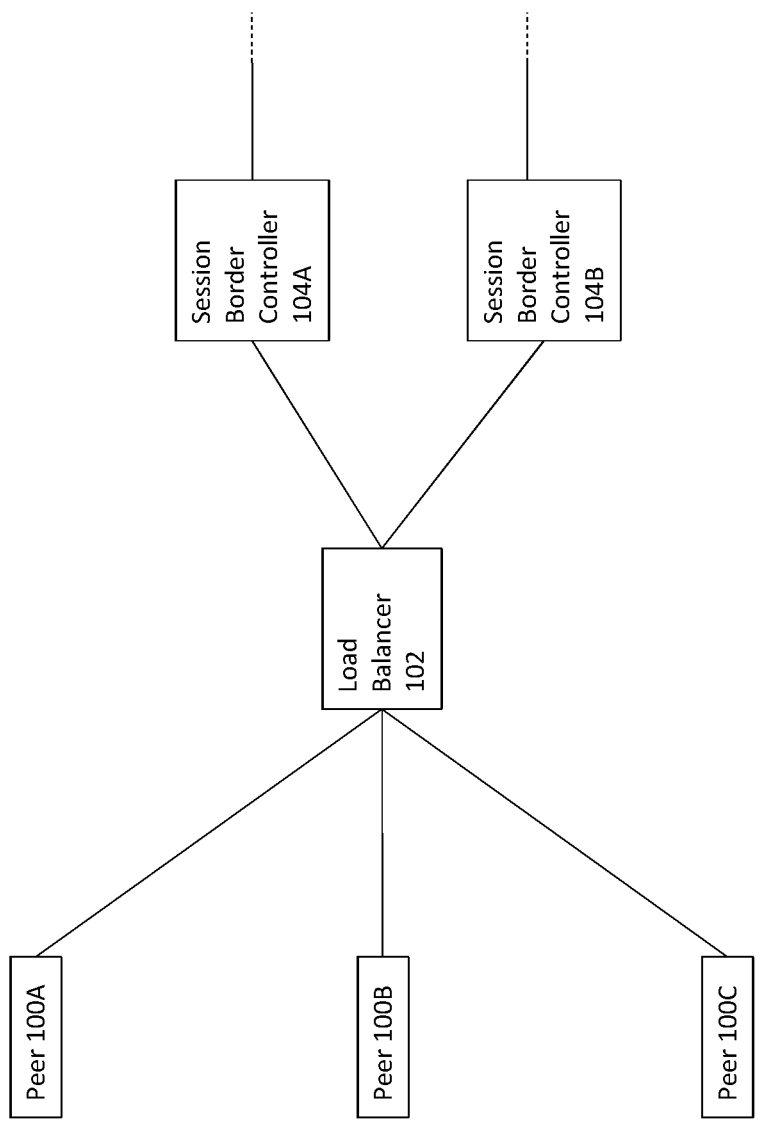
FIG. 1 is a schematic block diagram depicting an arrangement of SIP devices in accordance with an example of the present disclosure.

FIG. 1 shows a general arrangement of SIP devices in accordance with an example of the present disclosure, in which peer devices 100A, 100B, 100C are connected to a load balancer 102 via data communications links, which in turn is connected to each of a pool of session border controllers 104A, 104B via data communications links. The session border controllers 104A, 104B reside in the same network as that in which the load balancer 102 resides, which may be referred to as the local network. The peer devices 100A, 100B, 100C reside in one or more external networks, and may also be session border controllers. The load balancer 102 is an edge device of the local network. Note that whilst only two session border controllers 104A, 104B are shown, more than two may be included in the pool. In addition, there may be more than one load balancer 102; these may also be pooled or paired in order to provide additional resiliency and/or bandwidth. Further, whilst three peer devices 100A, 100B, 100C are shown in this example, any number of peer devices may be included.

The load balancer 102 distributes a balanced amount of SIP signaling traffic from peer devices 100A, 100B, 100C, to each of the pool of session border controllers 104A, 104B. The load balancer also forwards SIP signalling traffic from each of the session border controllers 104A, 104B to the peer devices 100A, 100B, 100C, as determined by routing information in the SIP messages.

SIP messages include requests and responses. SIP endpoint devices send request messages to other SIP endpoint devices, which respond to those request messages with one or more responses. The responses may include provisional responses with a response code in the form 1xx, and one or multiple final responses (2xx-6xx).

A request message includes in a SIP Uniform Resource Indicator (URI) included in the first line of the message, known as a Request-URI, which indicating where the request should be sent. A SIP device receiving the message may use the Domain Name Service (DNS) to look up an IP address to which the request message should be forwarded. The first line of a response message has a response code.

SIP is a transactional protocol: interactions between components take place in a series of independent message exchanges. A SIP transaction consists of a single request and any responses to that request, which include zero or more provisional responses and one or more final responses. The responses may include provisional responses with a response code in the form 1xx, and one or multiple final responses (2xx-6xx).

Transactions may be categorized as either Invite or Non-Invite. Invite transactions differ in that they can establish what is referred to as a dialog in SIP.

In SIP, dialogs are identified by the combination of call-ID, local tag and remote tag. The local tag may be a From or To: tag, and the remote tag a To or From: tag, depending on whether the message is a request or a response. A response message may contain values for the Call-ID, From, and Request-URI that are equal to the values of those header fields in the "original request". The Call-ID header value is typically unique in order to avoid duplication of requests.

A SIP device, for example load balancer 102, may inspect the 28TRequest-URI28T but typically does not change it because it is not responsible for the resource indicated in the URI. It may also remove Route header field values and add Record-Route header field values. For example, on confirming that its URI is the first value in the 28TRoute28T header field, it may remove that value. It may add a 28TRecord-Route28T header field value to record its URI. It may then forward the request to the resource indicated in the 28TRequest-URI28T (the route set is now empty) by applying DNS procedures, unless it is instructed to apply a different procedure by a session border controller 104A, 104B, as will be described below.

Routing Control from a Session Border Controller

The load balancer 102 and each session border controller 104A, 104B may add an additional header to some or all SIP messages between them.

This additional header allows a session border controller 104A, 104B to perform routing resolution operations, which may be based on policies and algorithms integrated into the functionality of the session border controller 104A, 104B on behalf of the load balancer 102, and then originate and send instructions to the load balancer 102 how to route messages. The session border controller does this by originating routing control parameters different to the, or all, URIs which are also contained in the SIP message for routing purposes, such as the Request-URI in a request message or a URI contained in a Route header of a response message. The routing control parameters are indicative of e.g. the IP addresses, ports and network to be used for the forwarding of the message to the peer 100A, 100B, 100C from the load balancer 102), and can be instructed on a per message basis. Thereby the session border controller is able to programmatically instruct the load balancer 102 to use this routing, without the load balancer 102 having to conduct the kind of routing resolution procedures already conducted in the session border controller. The instructed routing control parameters preferably take precedence over all other routing information contained in a SIP message, at the load balancer 102. The load balancer 102 may use the instructed routing instead of, or in addition to, using other routing procedures which can conducted on the load balancer 102, for example DNS lookup based on a URI included in the SIP message as performed during conventional routing by a SIP proxy. Alternatively, the load balancer 102 may not use any alternative routing procedures and rely solely on the routing control instructions originated at the session border controllers 104A, 104B.

Routing information for use by a session border controller 104A, 104B may also be communicated from the load balancer 102 to the session border controller 104A, 104B in an additional header. This allows additional incoming routing information parameters, in addition to any of the routing characteristics included in the message in the form of URIs all the URIs in the Route header of a message or in a Record-Route header of a message. These additional incoming routing information parameters are originated at the load balancer 102 and are based on one or more additional incoming routing characteristics detected by the load balancer 102. They may be inserted into the incoming SIP message by the load balancer 102; this provides information on the e.g. a network identity, IP and port on which a SIP message was received and the IP and port from which it was sent.

As mentioned above, the routing control parameters may be included in an additional, e.g. proprietary, header. Alternatively, the instructions may be encoded in other ways, for example these may be contained in an encapsulation header by encapsulating the message in a tunnelling protocol so the messages between the load balancer 102 and session border controller 104A, 104B are encapsulated versions of the messages flowing to/from the egress side of the load balancer 102.

In this example the additional header, referred to herein as the X-MSW-LB-Info header, may be added to some or all SIP messages between a session border controller 104A, 104B and the load balancer 102. Some messages exchanged between the two may not include the header, for example direct OPTIONS polling messages, which are not forwarded on by the load balancer 102. The additional header is used to communicate outgoing routing control parameters, such as network identifying instructions, local and remote IP instructions, port instructions and connection type instructions, from a session border controller 104A, 104B to the load balancer 102.

In messages sent from a session border controller 104A, 104B to the load balancer 102, the additional header may be used to indicate which external network and source IP address should be used for forwarding a message, along with the destination IP and port. When using TCP, a routing control parameter indicating a local port of zero may be used as an instruction to the load balancer 102 to choose any port, and a routing control parameter indicating a non-zero local port may be used as an instruction to the load balancer 102 to use an existing connection from that port if available, and otherwise to choose any.

The content of the X-MSW-LB-Info header may include the following fields, set out in an exemplary format:

<networkName>;lcl=<localIP>:<port>;
rmt_conn=<remoteIP>:<existingPort>;rmt=<remoteIP>:<port>;transport=tls Multiple IP:port pairs may be used for the <remoteIP>:<port> field.

The fields used in the X-MSW-LB-Info header may be optional and may be used in any combination. Preferably, all are used, except that the rmt_conn=<remoteIP>:<existingPort> part is only included in SIP messages sent as TCP responses from the session border controller to the load balancer 102. When used, fields used in the X-MSW-LB-Info header indicate the following, as set out in Table 1 below.

TABLE 1

| Field of X-MSW-LB-Info header | On messages sent by the load balancer to the session border controller, indicates the . . . | On messages sent by the session border controller, indicates the . . . |
|---|---|---|
| <networkName> | Identity of the external network on which the message was received by the load balancer from the peer device | Identity of the external network on which to forward the message from the load balancer |
| lcl=<localIP>:<port> | Destination IP address and destination port on the load balancer on which the message was received from the peer device | Source IP address and source port on the load balancer to use to forward the message from the load balancer. Note that the port may be ignored by the load balancer when establishing new outbound TCP connections. |
| rmt_conn=<remoteIP>:<port> | N/A | For TCP responses only: Identification of existing TCP connection to use for forwarding the message from the load balancer. For example, destination IP address and destination port on the peer device may be used in conjunction with local IP and port to identify connection. |

TABLE 1-continued

| Field of X-MSW-LB-Info header | On messages sent by the load balancer to the session border controller, indicates the . . . | On messages sent by the session border controller, indicates the . . . |
| --- | --- | --- |
| rmt=<remoteIP>:<port>; | Source IP address and source port of the message received at the load balancer from the peer device | For all messages except for TCP responses: Destination IP address and destination port on the peer device to use for forwarding the message. For TCP responses: Destination IP address and destination port on the peer device to use for new or alternate connection for forwarding the message |
| transport=tls | Connection to the peer device used TLS | Instructs load balancer to use TLS on a connection to the peer device |

Both the load balancer 102 and the session border controller 104A, 104B may remove the X-MSW-LB-Info header before forwarding the message to any other devices, so this header only appears on the network between the load balancer 102 and the session border controllers.

Identifying a Session Border Controller

A session border controller 104A, 104B, may operate as a back-to-back user agent (B2BUA) or in dialog-transparent mode. When dialog transparent operation is in use, it is possible for the same dialog to transit the same device multiple times (e.g. due to call forwarding). In this case, a session border controller 104A, 104B may use a username part of the URI in the Record-Route header it adds to distinguish different instances of a dialog—this may be referred to as a spiral identifier.

When a network operator deploys a load balancer 102 in accordance with examples of the present disclosure, it and the pool of session border controllers appear as a single device to the peers, instead of several session border controllers with a proxy in front of them. This allows the network operator to carry out load balancing, use the session border controller's advanced routing features, and implement topology hiding for the entire core network. To allow messages to be directed appropriately, the session border controllers may add identifiers for themselves to SIP headers, which the load balancer 102 uses to route in-dialog requests and responses from peers.

When the load balancer 102 selects a session border controller 104A, 104B to handle a request from a peer or when the session border controller 104A, 104B initiates a dialog, the same session border controller 104A, 104B may process all subsequent requests or responses for that dialog. The session border controller 104A, 104B therefore adds identifiers for itself to various headers, depending on whether the session border controller 104A, 104B is acting in back-to-back user agent (B2BUA) or dialog-transparent (proxy-like) mode.

When a session border controller 104A, 104B acts as a B2BUA, it establishes separate dialogs for each side of the call, so each side of the call has different dialog identifiers (the call-IDs, From: tags and To: tags).

When a session border controller 104A, 104B uses dialog transparency (often in IMS deployments), it does not establish separate dialogs, and it passes the dialog identifiers through unchanged.

This affects how the session border controller 104A, 104B modifies the headers to direct in-dialog requests. If the session border controller 104A, 104B is acting as a B2BUA, it can add identifiers for itself to the dialog identifiers.

If it is using dialog transparency, rather than altering the dialog identifiers, the session border controller 104A, 104B adds an identifier for itself in a Record-Route header instead. In both cases, these identifiers are available to the load balancer 102 during the entire call, so the load balancer 102 can use them to route requests.

The session border controller 104A, 104B also adds an identifier for itself to the branch tag of the top Via header. This allows the load balancer 102 to route any responses from peers to the session border controller 104A, 104B that initiated the request.

Session border controller 104A, 104B instances may identify themselves using their IP addresses on the internal network shared with the load balancer 102. This avoids having to configure extra identifiers between the load balancer 102 and session border controller. To provide topology hiding and to minimize any increase in size of SIP messages, session border controller identities in the form of IP addresses may be encoded in the relevant SIP parameters in base32 format, excluding any pad bytes. Examples for each of the headers affected are described below.

Single Via Header for Both Session Controller and Load Balancer

When a SIP request message is originated or forwarded by a conventional SIP device, it inserts a Via header into that request. The Via header may identify the protocol name (SIP), protocol version, transport type (e.g. UDP or TCP), IP address, and the port (typically 5060) used for the request. This information allows the recipient of the request to return SIP responses to the correct device. It also includes a branch parameter, also referred to as a branch tag, that includes a transaction identifier, that may be used for correlation of the SIP transaction at the device which has added the Via header. Conventionally every device adds its own Via header, before sending a SIP request. If there is already a Via header in a message, a conventional device adds a new Via header at the top of the list before sending it to the next hop. On the return path, a conventional SIP device will identify its own Via header and remove it.

In accordance with examples of the present disclosure, the load balancer 102 does not add a Via header but shares the one received from the the session border controllers when forwarding SIP messages to peer devices. The load balancer 102 maintains the received Via header as the single or topmost Via header when forwarding messages from a session border controller. Further, the load balancer 102 and does not reduce the number of Via headers when forwarding SIP messages to a session border controller from a peer device—the incoming single or topmost Via header is maintained as the single or topmost Via header when being forwarded to the session border controller. The shared Via contains branch tag information, in the form of a transaction ID generated by the session border controller 104A, 104B, and also the IP address in the Via is the external IP address of the load balancer 102. When this single Via header is sent from the load balancer 102, it also includes, in concatenated form in the branch tag, a session border controller ID. This branch tag information may be originated when the Via header is originally added at the session border controller 104A, 104B, or may be added by the load balancer 102 before it forwards the message on to a peer 100A, 100B, 100C.

Branch Tag Format

In examples of the disclosure, the branch tag may include a transaction identifier including the following elements:
  RFC 3261 magic cookie
  32 character hash value
  "1"
  +Session border controller ID
  +an internal uniqueness identifier
  +unique incrementing counter value
  For example:
  branch=z9hG4bK+
9bc07967265d7be93eae231d2de7a5d71+<session_border_controller_ID>+6+a64e7dd9

The session border controller ID element may be an IP address of the session border controller 104A, 104B, which may be encoded using standard base32 encoding per RFC 4648 but with all pad characters removed. For example, 192.91.191.220 is 24, 1, 13, 27, 31, 23, 0 in base 32, mapping to YBN37XA once standard symbol table is used.

Call-ID Format

The Call-ID format on most requests originated by session border controller 104A, 104B is unchanged as it is a function of the received call ID. However, where a session border controller 104A, 104B originates call IDs, such as on OPTIONs polls, the existing format is extended to include the session border controller identifier.

In examples of the disclosure, the Call-ID may include the following elements:
  A random string of variable length to ensure uniqueness
  An internal uniqueness identifier
  Session border controller ID
  The IP address of the load balancer
  The port of the load balancer
  For example:
  Call-Id: 562F6E34-2-<session_border_controller_ID>@10.22.13.77:5060

The session border controller ID element may be an IP address of the session border controller instance which may be encoded using standard base32 encoding per RFC 4648 but with all pad characters removed.

Note that while the Call-ID is changed as a result of adding the session border controller ID, this change has no impact on other components in a SIP signalling system, as no information typically needs to be extracted from call IDs.

To/from: Tag Format

When a session border controller 104A, 104B creates a To: tag for a dialog creating response or a From: tag for a dialog creating request, it can add the session border controller identity as shown in the following example. Note that if the session border controller 104A, 104B sends a SIP message without using the load balancer, it may omit the session border controller ID.

In examples of the disclosure, the To: and From: tag may include the following elements:
  A local ID (IP or hostname or the characters "sip" if none specified)
  An internal uniqueness identifier
  A first random string
  A second random string
  Session border controller ID For example:
  tag=sip+3+10600008+5768eb62+<session_border_controller_ID>

Again, the session border controller ID element may be an IP address of the session border controller instance which may be encoded using standard base32 encoding per RFC 4648 but with all pad characters removed.

Record-Route Header and Route Header Format

When a session border controller 104A, 104B adds a Record-Route header to in-dialog or dialog-creating requests, typically in dialog transparent mode, it encodes it with additional information before sending via the load balancer.

In examples of the disclosure, the username part of the URI in the Record-Route header may include the following elements:
  Spiral ID
  Session border controller ID
  Loose routing flag ("lr")
  For example:
  Record-Route: sip:<spiral ID-<session_controller_ID>@<hostname/IP>;lr>

In the above, the Record-Route header includes only a single URI as the session border controller 104A, 104B is the originator of the message. The Record-Route header may alternatively be a comma separated list of URIs.

As this is then returned as the route set on subsequent inbound requests, the load balancer can determine the target session border controller 104A, 104B by extracting the session border controller 104A, 104B identity, e.g. IP address, from the username in the top Route.

The spiral ID may be an ASCII hex representation of a 64-bit random number so may have 16 characters. The presence of the session border controller ID is indicated by a hyphen following the spiral ID. The session border controller ID may be omitted in out-of-dialog messages.

As for previous cases, the session border controller ID may be an IP address of the session border controller 104A, 104B, which may be encoded using standard base32 encoding per RFC 4648 but with all pad characters removed.

The format of the Route header entries are essentially the same as the Record-Route header—the Route header is a comma separated list of URIs, and note that the format of routes other than the first is not necessarily controlled by session border controller 104A, 104B.

For example:
  Route: sip:4F35D36AB56D915A–<session_controller_ID>@perimeta.metaswitch.com;lr, sip:ss2.biloxi.example.com;lr Again, the session border controller ID element may be an IP address of the session border controller instance which may be encoded using standard base32 encoding per RFC 4648 but with all pad characters removed.

When a session border controller 104A, 104B is acting as a B2BUA, it may add an identifier for itself to the following locations:
  The To: tag, if it receives a request from a peer 100A, 100B, 100C via the load balancer.
  The From: tag, if it sends a request to a peer 100A, 100B, 100C via the load balancer.
  The branch tag of the top Via header.

The load balancer may use the identifier in the To: or From: tag in subsequent in-dialog requests to identify the session border controller 104A, 104B involved in the dialog and route requests from peers appropriately. It uses the identifier in the branch tag of the Via header to route responses from the peer to the session border controller 104A, 104B that sent the request. Exemplary call flows are set out below.

Distributing Requests to B2BUA Session Border Controllers

Figure 2:
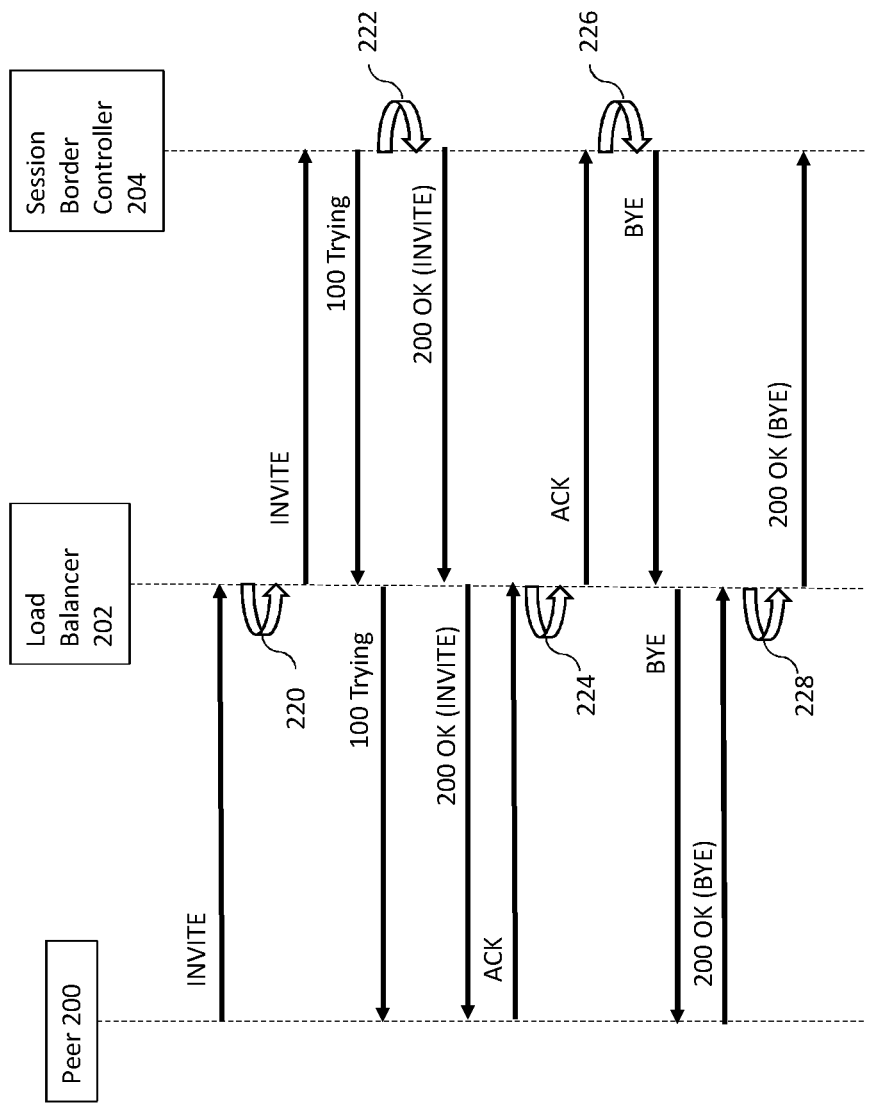
FIG. 2 is a call flow diagram depicting a SIP call flow in accordance with an example of the present disclosure.

FIG. 2 shows an exemplary call flow illustrating how a load balancer 202 and a B2BUA session border controller 204 route messages in a call from a peer device 200. In this exemplary call flow, the peer device 200 sends an INVITE message to the load balancer 202. The load balancer 202 uses a distribution algorithm, for example a consistent hash function applied to a unique value within the message, for example the transaction ID contained within the branch tag of the Via header, to select, step 220, the session border controller from the pool to which it forwards the INVITE message. The session border controller 204 responds with a 100 Trying message, which the load balancer 202 forwards on to the peer.

When the call is answered, the session border controller 204 generates a 200 OK (INVITE) message, adds its session border controller identity to the To: tag, step 222, and sends the 200 OK (INVITE) message to the load balancer 202. The load balancer 202 forwards the 200 OK (INVITE) message to peer device 200, which responds with an ACK, which includes the To: tag previously added to the dialog by the session border controller 204. The load balancer 202 uses the session border controller identity in the To: tag to identify, step 224, which of the session border controllers in its pool to send the ACK message on to, and then forwards the ACK message to the correct session border controller 204. The session border controller 204 generates a BYE message, adds its session border controller identity to the Via header branch tag, step 226, and sends the BYE message to the load balancer 202. The load balancer 202 forwards the BYE message to the peer device 200, which responds with a 200 OK (BYE) message. The load balancer 202 uses the session border controller identity in the Via header branch tag to identify, step 228, which of the session border controllers in its pool to send the 200 OK (BYE) message on to, and then forwards the 200 OK (BYE) message to the correct session border controller 204.

Figure 3:
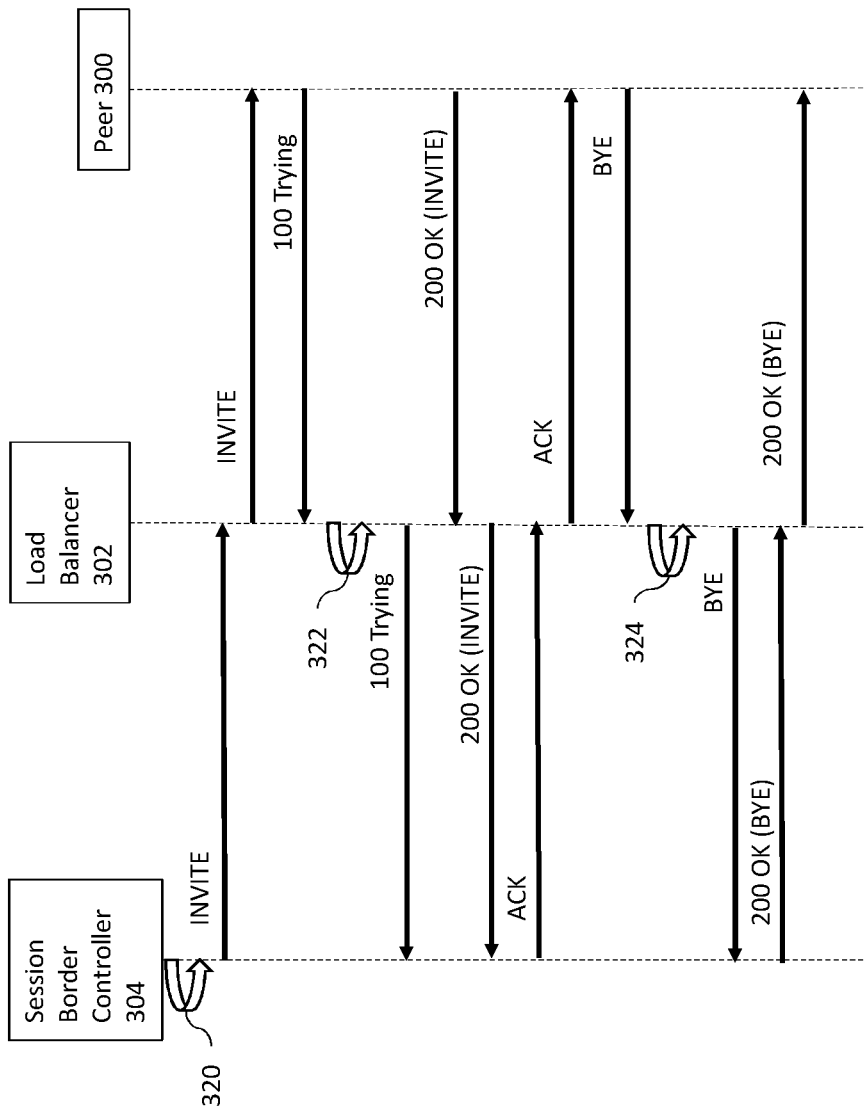
FIG. 3 is a call flow diagram depicting a SIP call flow in accordance with an example of the present disclosure.

FIG. 3 shows an exemplary call flow illustrating how a load balancer 302 and a B2BUA session border controller 304 route messages in a call to a peer device 300. In this exemplary call flow, when the call is initiated, the session border controller 304 generates an INVITE message, adds its session border controller identity to the To: tag, step 320, and also adds its session border controller identity to the Via header branch tag, step 320, and sends the INVITE message to the load balancer 302, which forwards it to the peer device 300. The peer device 300 responds with a 100 Trying message. The load balancer 302 uses the session border controller identity in the Via header branch tag to identify, step 322, which of the session border controllers in its pool to send the 100 Trying message on to, and then forwards the 100 Trying message to the correct session border controller 304.

When the call is answered, the peer device 100 generates a 200 OK (INVITE) message, the load balancer 302 forwards the 200 OK (INVITE) message to session border controller 304, which responds with an ACK. The peer device 100 generates a BYE message. The load balancer 302 uses the session border controller identity in the To: tag to identify, step 324, which of the session border controllers in its pool to send the BYE message on to, and then forwards the BYE message to the correct session border controller 304. The session border controller 304 responds with a 200 OK (BYE) message, which the load balancer forwards on to the peer device 300.

Distributing Requests to Dialog-Transparent Session Border Controllers

When a session border controller is using dialog transparency, it cannot modify the To: and From: tags. Instead, it adds an identifier to the username in a Record-Route header and to the branch tag of the topmost Via header. When the endpoint sending the request receives a response, it converts the Record-Route headers to a route set and encodes this route set, including the session border controller's identifier, in Route headers.

The load balancer uses the identifier in the username of the Route header in subsequent in-dialog requests to identify the session border controller involved in the dialog and route requests from peers appropriately. It uses the identifier in the branch tag of the Via header to route responses from the peer to the Session border controller that sent the request.

Figure 4:
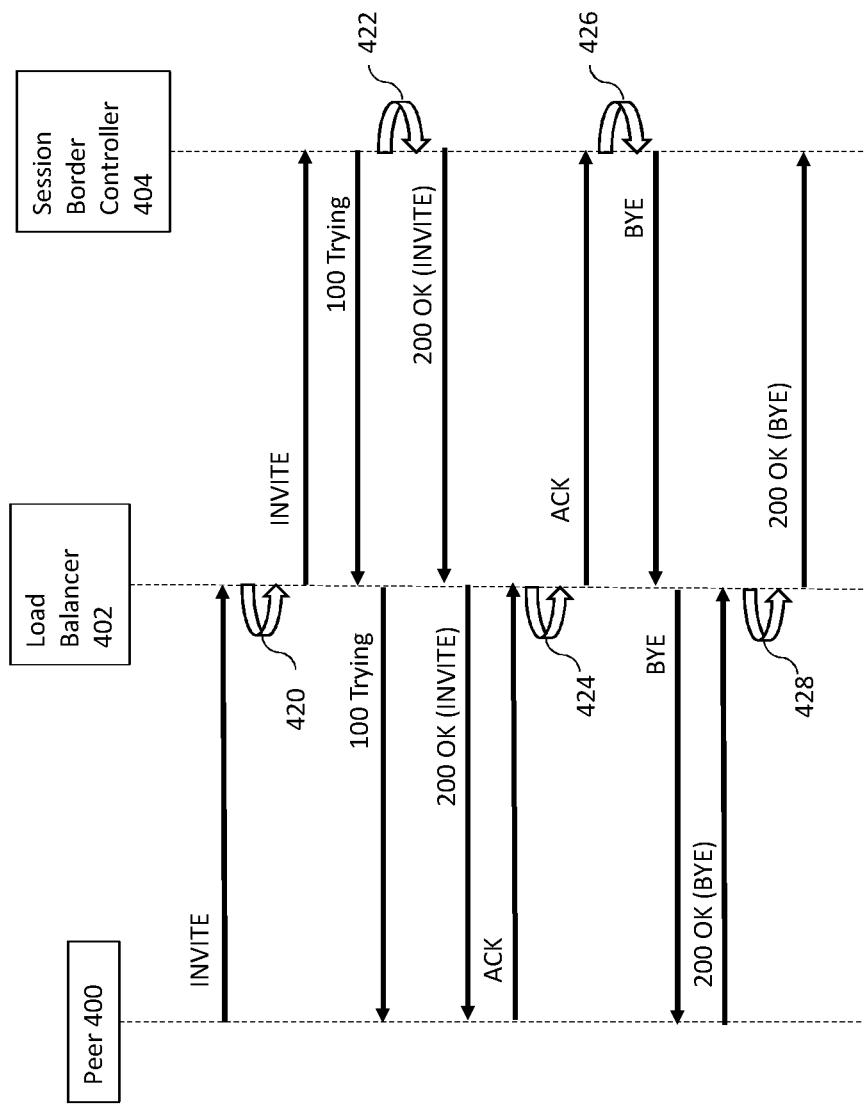
FIG. 4 is a call flow diagram depicting a SIP call flow in accordance with an example of the present disclosure.

FIG. 4 shows an exemplary call flow illustrating how a load balancer 402 and a dialog-transparent session border controller 404 route messages in a call from a peer device 400. In this exemplary call flow, the peer device 400 sends an INVITE message to the load balancer 402. The load balancer 402 uses a distribution algorithm, for example a consistent hash function applied to a unique value within the message, for example the transaction ID contained within the branch tag of the Via header, to select, step 420, the session border controller from the pool to which it forwards the INVITE message. The session border controller 404 responds with a 100 Trying message, which the load balancer 402 forwards on to the peer. When the call is answered, the session border controller 404 generates a 200 OK (INVITE) message, adds its session border controller identity to the username of the URI in a Record-Route header as a top route entry, step 422, and sends the 200 OK (INVITE) message to the load balancer 402. The load balancer 402 forwards the 200 OK (INVITE) message to peer device 400, which responds with an ACK, which includes a Route header containing the session border controller identity in the username of the URI previously added to the Record-Route header by the session border controller 404. The load balancer 402 uses the session border controller identity in the Route header to identify, step 424, which of the session border controllers in its pool to send the ACK message on to, and then forwards the ACK message to the correct session border controller 404. The session border controller 404 generates a BYE message, adds its session border controller identity to the Via header branch tag, step 426, and sends the BYE message to the load balancer 402. The load balancer 402 forwards the BYE message to the peer device 400, which responds with a 200 OK (BYE) message. The load balancer 402 uses the session border controller identity in the Via header branch tag to identify, step 428, which of the session border controllers in its pool to send the 200 OK (BYE) message on to, and then forwards the 200 OK (BYE) message to the correct session border controller 304.

Figure 5:
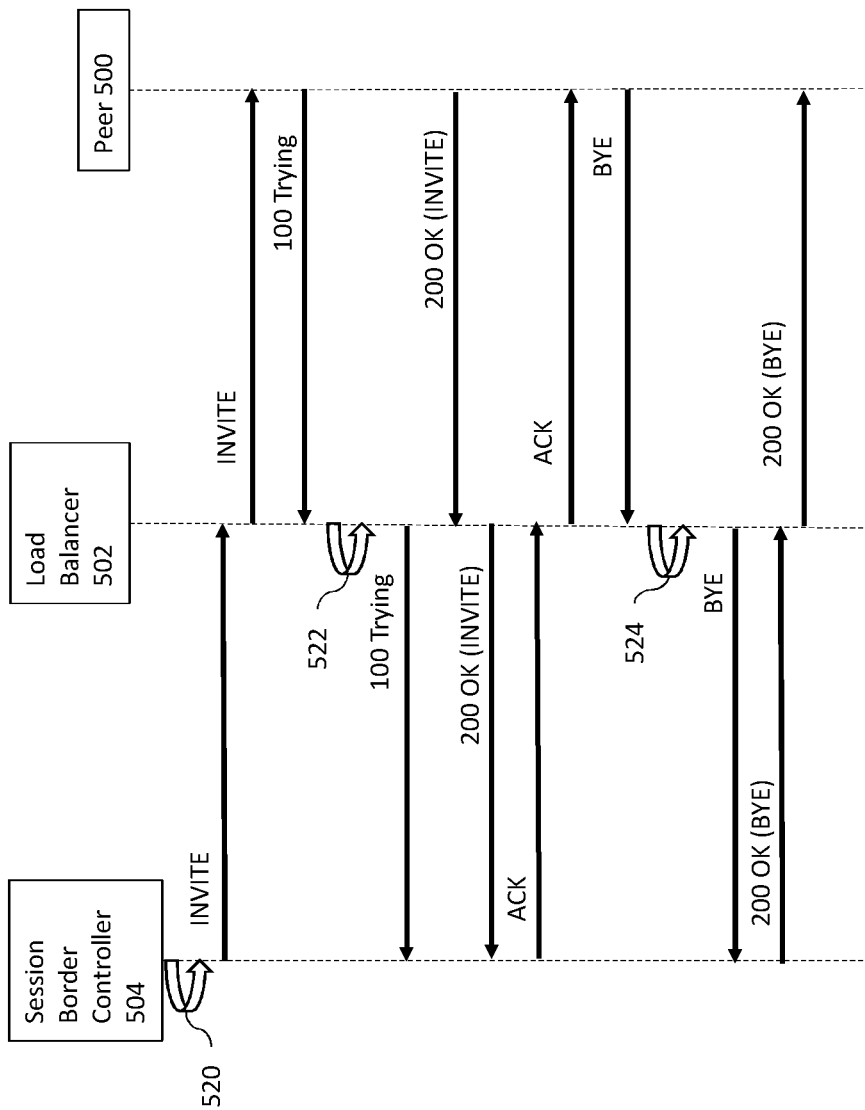
FIG. 5 is a call flow diagram depicting a SIP call flow in accordance with an example of the present disclosure.

FIG. 5 shows an exemplary call flow illustrating how a load balancer 502 and a dialog-transparent session border controller 504 route messages in a call to a peer device 500. In this exemplary call flow, when the call is initiated, the session border controller 504 generates an INVITE message, adds its session border controller identity to the username of the URI in a Record-Route header as a top route entry, and also adds its session border controller identity to the Via header branch tag, step 520, and sends the INVITE message to the load balancer 502, which forwards it to the peer device 500. The peer device 500 responds with a 100 Trying message. The load balancer 502 uses the session border controller identity in the Via header branch tag to identify, step 522, which of the session border controllers in its pool to send the 100 Trying message on to, and then forwards the 100 Trying message to the correct session border controller 504.

When the call is answered, the peer device 100 generates a 200 OK (INVITE) message, the load balancer 502 forwards the 200 OK (INVITE) message to session border controller 504, which responds with an ACK. The peer device 100 generates a BYE message. The load balancer 502 uses the session border controller identity in the Route header to identify, step 524, which of the session border controllers in its pool to send the BYE message on to, and then forwards the BYE message to the correct session border controller 504. The session border controller 504 responds with a 200 OK (BYE) message, which the load balancer forwards on to the peer device 500.

Figure 6:
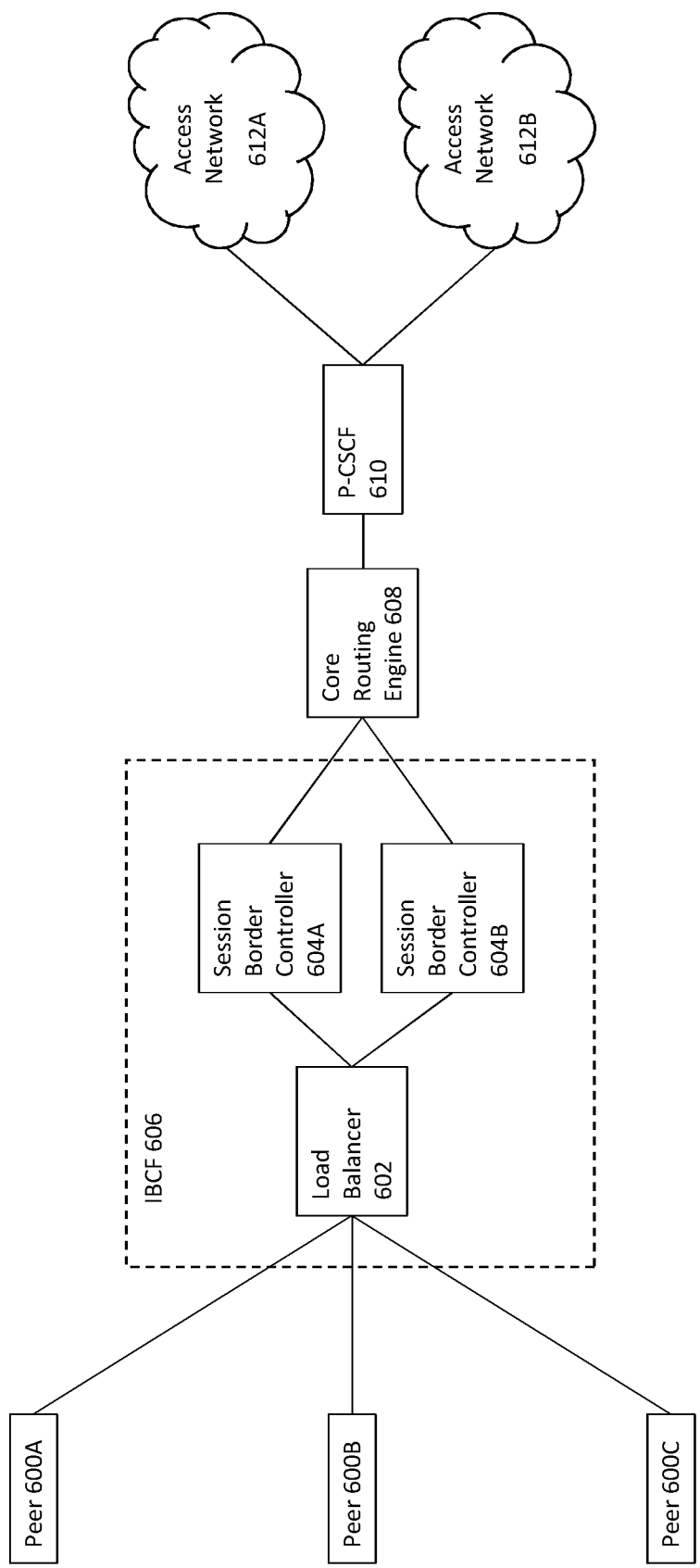
FIG. 6 is a schematic block diagram depicting an arrangement of SIP devices in accordance with an example of the present disclosure.

FIG. 6 is a schematic block diagram depicting a Mobile IBCF deployment of SIP devices in accordance with an example of the present disclosure. Here, the deployment includes a Core Routing Engine 608, an IMS P-SCCF and one or more access networks 612A, 612B.

In this type of deployment, the session border controllers and the load balancer can function together as the IBCF 606. The load balancer 602 forms the external side of the IBCF 606, and distributes traffic to the pool of session border controllers 604A, 604B. This allows the network operator to control the distribution instead of relying on the peer devices 600A, 600B, 600C to send traffic to individual session border controllers. The network operator can also add or remove session border controllers when the load changes.

Figure 7:
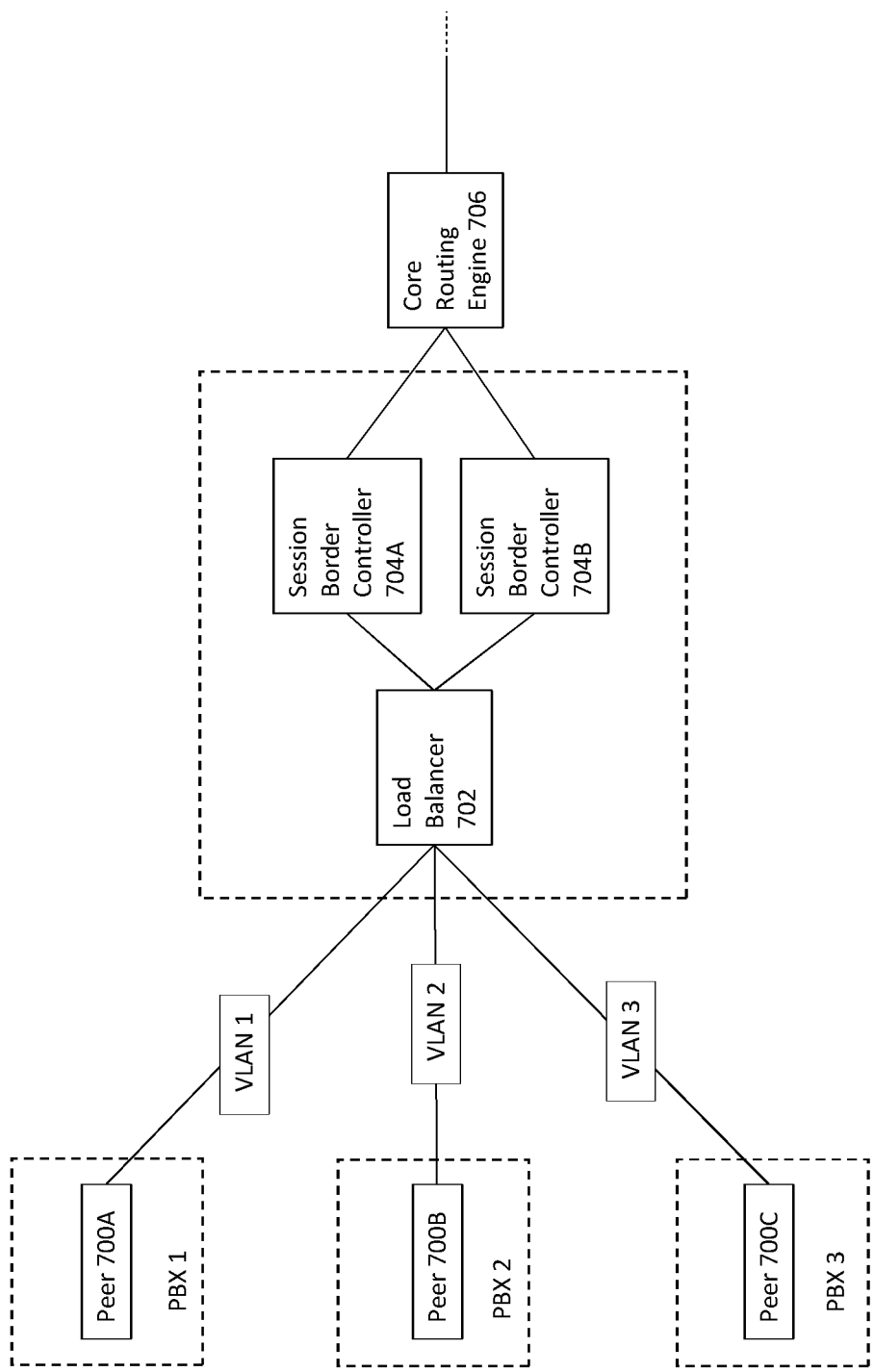
FIG. 7 is a schematic block diagram depicting an arrangement of SIP devices in accordance with an example of the present disclosure.

FIG. 7 is a schematic block diagram depicting a deployment of SIP devices in accordance with an example of the present disclosure, in which the session border controllers 704A, 704B are connected to a Core Routing Engine 706. Enterprise SIP trunk deployments typically have high numbers of small-scale customer enterprise peer devices 600A, 600B, 600C, located in for example enterprise PBXs. The connections are often over private networks, which means the point of access between the core network and these devices may be configured to connect to thousands of different networks. The load balancer 702 may be connected to the peer devices 700A, 700B, 700C, via virtual local area networks (VLANs) with overlapping address spaces to separate the traffic from the enterprise devices or assign specific session border controllers to each deployment.

In this type of deployment, the load balancer 702 acts as the point of access for all the enterprise customers. If the deployment uses VLANs, the network operator can continue to use VLANs on the networks connecting to the enterprise devices, but configure the network between the load balancer 702 and the session border controllers 704A, 704B, 704C, without VLANs, which may make the networking configuration simpler and easier to manage. Secondly, the network operator can manage the existing session border controllers, use spare capacity on existing session border controllers and add extra session border controllers without affecting the customers.

In a further alternative example, the load balancer and pool of session border controllers may be used in wholesale interconnect deployments, which typically have a pool of session border controllers connecting to a very large number of peer carriers. Most of the traffic is SIP calls, and the load may be too large for a single session border controller to handle. Without the load balancer, the network operator would rely on the peer carriers to distribute load to individual session border controllers. In this type of deployment, the load balancer allows the network operator to control the distribution of traffic to session border controllers, and add or remove session border controllers when the load changes, without needing the peers to update their configuration. This is because all the peers direct the traffic to the load balancer, instead of to individual session border controllers.

Architecture and Redundancy of the Load Balancer

The load balancer may be deployed as a number of virtual machines (VMs) to provide redundancy. It may use virtual IP addresses, which may be used on the external service network(s) to route SIP traffic between peers and load balancer VM instances. The virtual IP address(es) on the internal network may be used to route traffic between session border controllers in the pool and load balancer VM instances.

The virtual IP addresses may be moved to another instance if an instance stops being able to carry out load balancing. The load balancer VM instances may use the Virtual Router Redundancy Protocol (VRRP) between them to determine which instance currently owns the virtual IP addresses.

The load balancer VM instances may check connectivity to service and management networks using ARP (IPv4) or NDP (IPv6) probes. The connections over the load balancer's management interface may use secure protocols such as include HTTPS (for the configuration REST API), SSH (for logging in remotely) and SFTP (for file transfer).

To protect the network in which they are installed, the load balancer may conduct full firewalling of all network ports. The load balancer may be configured to only accept traffic on specific open ports and it may be configured to drop SIP and management traffic that is not from designated sources. The load balancer may discard of unusual or risky packets, for example IP options and ICMP redirect packets.

Using a load balancer to distribute load across a pool of session border controllers in accordance with examples of the present disclosure offers the following advantages:
  It minimizes the number of external IPs required, which may be a consideration in some environments.
  It makes firewalling SIP traffic easier.
  It simplifies trunk provisioning, because trunks do not need to be connected to a specific session border controller. This in turn makes capacity planning and scaling easier, because increase the number of session border controllers in a deployment may be increased when the amount of traffic increases.
  It simplifies interoperation with partner carriers or trunking PBX operators, because they only need to connect to a single, stable IP address.
  The load balancer can distribute SIP signaling load to Signaling session border controllers (SSCs) and/or Integrated session border controllers (ISCs) in mobile and wholesale interconnect deployments or enterprise SIP trunking deployments.
  In trunking and interconnect scenarios, the Layer 7 load balancing provided by the load balancer allows SIP traffic on a single trunk to exceed the capacity of a single session border controller and incoming traffic to be distributed across multiple session border controllers. Layer ¾ load balancing cannot achieve this.
  The load balancer is in the SIP signaling path in both directions. This allows topology hiding, because it can present a single IP address for both inbound and outbound SIP requests to external networks.

Non-Limiting Additional Implementation Details

Embodiments described herein may be implemented in a virtualisation platform, for example an OpenStack or VMware environment, in which session border controllers and/or load balancers may be implemented as software instantiated on virtual machines. Alternative examples are implemented in non-virtualized environments or public cloud infrastructure, for example Amazon Web Services (AWS).

Although at least some aspects of the examples described herein with reference to the drawings comprise computer processes e.g. in the form of processing systems, agents or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary examples. In this regard, the exemplary examples may be implemented at least in part by computer software stored in (non-transitory) memory and executable by the processor, or by hardware, or by a combination of tangibly stored software and hardware (and tangibly stored firmware).

The above examples are to be understood as illustrative examples of the invention. Further examples of the invention are envisaged.

In the above embodiments, the session border controller ID is added by the session border controller into various header elements in SIP messages sent by the session border controller, such that those elements will be forwarded on by a load balancer and returned by a peer device in a SIP dialog. Alternatively, the session border controller ID may be added by the load balancer into the same various header elements in SIP messages after receipt by the load balancer from the session border controller, such that those elements will be forwarded on by a load balancer and returned by a peer device.

In the case of a Via header branch tag, for example, if the session border controller ID is added by the load balancer, the load balancer may add the session border controller ID in concatenated form onto transaction ID information received in a branch tag from the session border controller, and send a message containing the original transaction ID and the session controller ID in the branch tag of a single Via header representing the session border controller and load balancer. This provides the same level of topology hiding as in other examples, where both elements are added in a single Via by the session border controller and the load balancer does not add its own Via. If the session border controller ID is added on outgoing messages by the load balancer, it may also remove it from the branch tag on incoming messages, once it has determined the correct session border controller to forward the message to, before forwarding the remainder of the branch tag, containing the original transaction ID generated by the session border controller, for use by the session border controller for use in session control.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method for proxying Session Initiation Protocol (SIP) communications in a load balancing device, the method comprising:
receiving an outgoing SIP message from a session border controller device, the received outgoing SIP message comprising a routing control parameter in the form of a Uniform Resource Identifier (URI), wherein the received outgoing SIP message comprises one or more additional outgoing routing control parameters different to the URI, the one or more additional outgoing routing control parameters having been originated at the session border controller device to control one or more outgoing routing characteristics at the load balancing device;
extracting the one or more additional outgoing routing control parameters from the received outgoing SIP message;
forwarding the outgoing SIP message to a peer device using the one or more outgoing routing characteristics on the basis of the one or more extracted additional outgoing routing control parameters;
receiving an incoming SIP message from the peer device, the incoming SIP message having been routed from the peer device using incoming routing characteristics including a URI routing characteristic;
detecting one or more additional incoming routing characteristics, different to the URI routing characteristic, of the incoming SIP message;
inserting one or more additional incoming routing information parameters, based on the detected one or more additional incoming routing characteristics, into the incoming SIP message;
generating an altered incoming SIP message; and
forwarding the altered incoming SIP message to the session border controller device, the altered incoming SIP message comprising the one or more additional incoming routing information parameters.

2. The method of claim 1, comprising:
removing the one or more additional outgoing routing control parameters from the received outgoing SIP message; and
generating an altered outgoing SIP message,
wherein said forwarding step comprises forwarding the altered outgoing SIP message to the peer device, the altered outgoing SIP message comprising the URI and not comprising the one or more additional outgoing routing control parameters.

3. The method of claim 1, wherein the one or more additional outgoing routing control parameters comprise one or more of:
   a) a network identity control parameter indicative of an identifier of a network to use to forward the outgoing SIP message;
   b) a source IP address control parameter indicative of a source IP address to use to forward the outgoing SIP message;
   c) a source port control parameter indicative of a source port to use to forward the outgoing SIP message; and
   d) a transport layer security (TLS) control parameter to instruct the use of TLS on a connection over which the outgoing SIP message is to be forwarded.

4. The method of claim 3, wherein forwarding the outgoing SIP message comprises forwarding the outgoing SIP message using a Transmission Control Protocol (TCP) connection, and wherein at least some of the one or more additional outgoing routing control parameters relate to use of an existing TCP connection and comprise one or more parameters indicative of an identity of the existing TCP connection.

5. The method of claim 4, wherein at least some of the one or more additional outgoing routing control parameters relate to use of a new TCP connection when the existing TCP connection is unavailable and comprise one or more of:
   e) a destination IP address control parameter indicative of a destination IP address to use to forward the outgoing SIP message using the new TCP connection; and
   f) a destination port control parameter indicative of a destination port to use to forward the outgoing SIP message using the new TCP connection.

6. The method of claim 1, wherein the one or more additional incoming routing information parameters comprise one or more of:
   i) a network identity information parameter indicative of an identifier of a network from which the incoming SIP message is received;
   ii) a source IP address information parameter indicative of a source IP address from which the incoming SIP message is received;
   iii) a source port information parameter indicative of a source port from which the incoming SIP message is received; and
   iv) a transport layer security (TLS) information parameter to indicate use of transport layer security on a connection over which the incoming SIP message is received.

7. The method of claim 1, wherein the forwarding of the outgoing SIP message to the peer device comprises forwarding the outgoing SIP message without adding a Via header to the outgoing SIP message,
   wherein the forwarded outgoing SIP message includes an identifier for the session border controller device,
   wherein a received incoming SIP message includes the identifier for the session border controller device, and
   wherein the method comprises extracting the identifier for the session border controller device from the incoming SIP message and forwarding the incoming SIP message to the session border controller device on the basis of the extracted identifier.

8. A communications system comprising:
   a load balancer device adapted to conduct a method for proxying Session Initiation Protocol (SIP) communications; and/or
   a session border controller adapted to conduct SIP communication with a peer device via the load balancer device adapted to conduct the method for proxying SIP communications, the method for proxying SIP communications comprising:
      receiving an outgoing SIP message from a session border controller device, the received outgoing SIP message comprising a routing control parameter in the form of a Uniform Resource Identifier (URI), wherein the received outgoing SIP message comprises one or more additional outgoing routing control parameters different to the URI, the one or more additional outgoing routing control parameters having been originated at the session border controller device to control one or more outgoing routing characteristics at the load balancing device;
      extracting the one or more additional outgoing routing control parameters from the received outgoing SIP message;
      forwarding the outgoing SIP message to a peer device using the one or more outgoing routing characteristics on the basis of the one or more extracted additional outgoing routing control parameters;
      receiving an incoming SIP message from the peer device, the incoming SIP message having been routed from the peer device using incoming routing characteristics including a URI routing characteristic;
      detecting one or more additional incoming routing characteristics, different to the URI routing characteristic, of the incoming SIP message;
      inserting one or more additional incoming routing information parameters, based on the detected one or more additional incoming routing characteristics, into the incoming SIP message;
      generating an altered incoming SIP message; and
      forwarding the altered incoming SIP message to the session border controller device, the altered incoming SIP message comprising the one or more additional incoming routing information parameters.

9. A communications system comprising:
   a load balancer device adapted to perform a method for proxying Session Initiation Protocol (SIP) communications; and/or
   a session border controller adapted to conduct SIP communication with a peer device via the load balancer device adapted to conduct the method for proxying SIP communications, the method for proxying SIP communications comprising:
      receiving an outgoing SIP message from a session border controller device, the received outgoing SIP message comprising a routing control parameter in the form of a Uniform Resource Identifier (URI), wherein the received outgoing SIP message comprises one or more additional outgoing routing control parameters different to the URI, the one or more additional outgoing routing control parameters having been originated at the session border controller device to control one or more outgoing routing characteristics at the load balancing device;
      extracting the one or more additional outgoing routing control parameters from the received outgoing SIP message; and
      forwarding the outgoing SIP message to a peer device using the one or more outgoing routing characteristics on the basis of the one or more extracted additional outgoing routing control parameters, wherein the forwarding of the outgoing SIP message to the peer device comprises forwarding the outgoing SIP message without adding a Via header to the outgoing SIP message, and wherein the forwarded outgoing SIP message includes an identifier for the session border controller device, wherein a received incoming SIP message includes the identifier for the session border controller device, and wherein the method comprises extracting the identifier for the session border controller device from the incoming SIP message and forwarding the incoming SIP message to the session border controller device on the basis of the extracted identifier.

10. A method for proxying Session Initiation Protocol (SIP) communications in a load balancing device, the method comprising:

receiving an outgoing SIP message from a session border controller device, the received outgoing SIP message comprising a routing control parameter in the form of a Uniform Resource Identifier (URI), wherein the received outgoing SIP message comprises one or more additional outgoing routing control parameters different to the URI, the one or more additional outgoing routing control parameters having been originated at the session border controller device to control one or more outgoing routing characteristics at the load balancing device;

extracting the one or more additional outgoing routing control parameters from the received outgoing SIP message; and forwarding the outgoing SIP message to a peer device using the one or more outgoing routing characteristics on the basis of the one or more extracted additional outgoing routing control parameters, wherein the forwarding of the outgoing SIP message to the peer device comprises forwarding the outgoing SIP message without adding a Via header to the outgoing SIP message, and wherein the forwarded outgoing SIP message includes an identifier for the session border controller device, wherein a received incoming SIP message includes the identifier for the session border controller device, and wherein the method comprises extracting the identifier for the session border controller device from the incoming SIP message and forwarding the incoming SIP message to the session border controller device on the basis of the extracted identifier.

* * * * *